United States Patent [19]

Kessel et al.

[11] Patent Number: 5,432,006
[45] Date of Patent: Jul. 11, 1995

[54] SOLVENTLESS SILICONE RELEASE COATING

[75] Inventors: Carl R. Kessel; Kurt C. Melancon, both of St. Paul, Minn.

[73] Assignee: Minnesota Mining and Manufacturing Company, St. Paul, Minn.

[21] Appl. No.: 66,330

[22] Filed: May 21, 1993

Related U.S. Application Data

[63] Continuation of Ser. No. 794,346, Nov. 12, 1991, abandoned, which is a continuation of Ser. No. 489,363, Mar. 6, 1990, abandoned.

[51] Int. Cl.$^6$ .............. C08G 77/06; C08G 77/12; C08G 77/20; B32B 9/04
[52] U.S. Cl. ........................... 428/447; 428/448; 427/387; 528/15; 528/31; 528/32
[58] Field of Search ............ 528/15, 31, 32; 427/387; 428/447, 448

[56] References Cited

U.S. PATENT DOCUMENTS

| | | | |
|---|---|---|---|
| 2,676,182 | 4/1954 | Daudt et al. | 260/448.2 |
| 2,857,356 | 10/1958 | Goodwin, Jr. | 260/42 |
| 3,159,601 | 12/1964 | Ashby | 260/46.5 |
| 3,220,972 | 11/1965 | Lamoreaux | 260/46.5 |
| 3,419,593 | 12/1968 | Willing | 260/448.2 |
| 3,715,334 | 2/1973 | Karstedt | 260/46.5 |
| 3,936,581 | 2/1976 | Garden | 428/447 |
| 3,936,582 | 2/1976 | Keiser | 428/447 |
| 4,043,977 | 8/1977 | deMontigny et al. | 260/46.5 |
| 4,057,596 | 11/1977 | Takamizawa et al. | 260/825 |
| 4,133,939 | 1/1979 | Bokerman et al. | 528/30 |
| 4,162,356 | 7/1979 | Grenoble | 528/31 |
| 4,184,006 | 1/1980 | Hockemeyer et al. | 428/447 |
| 4,216,252 | 8/1980 | Mueller | 427/387 |
| 4,256,870 | 3/1981 | Eckberg | 528/15 |
| 4,310,678 | 1/1982 | Blizzard et al. | 556/451 |
| 4,322,518 | 3/1982 | Blizzard | 528/15 |
| 4,337,332 | 6/1982 | Melancon et al. | 528/15 |
| 4,448,815 | 5/1984 | Grenoble et al. | 427/387 |
| 4,510,094 | 4/1985 | Drahnak | 260/429 CY |
| 4,525,391 | 6/1985 | Eckberg et al. | 427/391 |
| 4,530,879 | 6/1985 | Drahnak | 428/352 |
| 4,603,215 | 7/1986 | Chandra et al. | 556/136 |
| 4,609,574 | 9/1986 | Keryk et al. | 427/407.1 |
| 4,705,765 | 11/1987 | Lewis | 502/152 |
| 4,726,964 | 2/1988 | Isobe et al. | 427/54.1 |
| 4,762,680 | 8/1988 | Pennace et al. | 428/40 |
| 4,870,149 | 9/1989 | Hara et al. | 528/15 |
| 4,923,944 | 5/1990 | Yamada et al. | 528/15 |
| 5,145,933 | 9/1992 | Grisoni et al. | 528/15 |

FOREIGN PATENT DOCUMENTS

| | | |
|---|---|---|
| 26950/88 | 6/1989 | Australia . |
| 0227340 | 7/1987 | European Pat. Off. . |
| 0322118 | 6/1989 | European Pat. Off. . |
| 0322118 | 6/1989 | European Pat. Off. . |
| 2232575 | 1/1975 | France . |
| 61-159480 | 7/1986 | Japan . |
| 83/03209 | 9/1983 | WIPO . |

OTHER PUBLICATIONS

Japanese Laid-Open Appln. No. 02,107,667 (Chem Abstracts 113:80235v).
European Appln. No. 375,363 (Chem Abstracts 113:133589x).

Primary Examiner—Melvyn I. Marquis
Assistant Examiner—Karen A. Dean
Attorney, Agent, or Firm—Gary L. Griswold; Walter N. Kirn; Christine T. O'Shaughnessy

[57] ABSTRACT

Curable, solventless, liquid polyorganosiloxane compositions provide release coatings that exhibit a slippery feel. The composition comprises (a) a first polydiorganosiloxane terminated by silyl groups having one reactive group; (b) a second polydiorganosiloxane terminated by silyl groups having one reactive group, the reactive group of (a) being the same or different from the reactive group of (b), said reactive groups of (a) and (b) being reactive with one another to form a covalent bond; (c) a polydiorganosiloxane having three or more reactive groups that are reactive with either the reactive group of (a) or the reactive group of (b) or both to form a covalent bond; and (d) a catalyst for effecting the reaction of the reactive groups of (a), (b), and (c) to form covalent bonds. When coated on a substrate and cured, the composition provides release liners for pressure-sensitive adhesive tapes and pressure-sensitive adhesive transfer tapes.

22 Claims, No Drawings

SOLVENTLESS SILICONE RELEASE COATING

This is a continuation of application Ser. No. 07/794,346 filed Nov. 12, 1991, now abandoned, which is a continuation of application Ser. No. 07/489,363, filed Mar. 6, 1990, now abandoned.

BACKGROUND OF THE INVENTION

1. Field of the Invention

This invention relates to solventless, curable polyorganosiloxane compositions, and in particular, to solventless, curable polyorganosiloxane compositions that can be used to prepare release coatings.

2. Description of the Prior Art

For many years, articles have been made non-adherent to adhesive materials by application of a silicone coating to the articles. Because the composition from which the silicone was coated generally was a highly viscous material, the use of solvents to dilute the silicone composition to a viscosity suitable for coating was required. Increasing pressure from federal, state, and local governments to control or eliminate the emission of solvents into the atmosphere has led manufacturers to develop means for avoiding the use of solvents. Two approaches have received considerable interest: (1) the use of aqueous systems in which the silicone composition is emulsified in water, and (2) solventless systems in which the silicone composition is coatable without the use of solvents.

Although the use of aqueous systems avoids the use of solvents, aqueous systems have not been satisfactory because of the generally poor wetting of many substrates by the aqueous silicone compositions and because of the amount of energy required to remove the water from the coatings.

Solventless silicone compositions generally provide release surfaces that exhibit a sticky or rubbery feel, which is disliked by users of certain types of transfer tapes. Users of large transfer tapes, e.g., tapes consisting of a layer of a pressure-sensitive adhesive borne on a removable silicone release liner, prefer to place the tape on the desired substrate, then press the tape down firmly with their hand or forearm, remove the silicone release liner, and then press the second substrate in contact with the exposed surface of the tape. The users desire that the release liner exhibit a slippery feel so that the friction between the liner and their hand or forearm not bring about chafing of the skin.

Solventless polyorganosiloxane compositions that are useful for providing substrates with a release coating are well known. Compositions comprising a vinylsilyl chain stopped polydiorganosiloxane, a crosslinking polyorganohydrogensiloxane, and a metal hydrosilation catalyst are disclosed in U.S. Pat. Nos. 3,936,581; 4,043,977; 4,162,356; 4,184,006; 4,216,252; 4,256,870; 4,337,332; 4,448,815; 4,609,574; and 4,762,680. None of the compositions disclosed in these patents provide a release surface that would have a slippery feel.

U.S. Pat. No. 4,057,596 discloses a solventless antisticking silicone composition comprising (a) a vinyldimethylsilyl end capped polydiorganosiloxane, (b) a hydrogendimethylsilyl end caped polydiorganosiloxane, (c) a polyorganosiloxane having at least three vinylsilyl groups, (d) a polyorganosiloxane having at least three hydrosilyl groups, and (e) a hydrosilation catalyst. The hydrosilation reaction product of such a composition does not have a slippery feel.

Japanese Kokai 61-159480 discloses a solventless composition for providing substrates with a release coating having a slippery feel comprising (1) 100 parts by weight of a polyorganosiloxane having a viscosity of 50 to 10,000 cps and containing 0.5 to 10 mole percent of vinyl group, (2) 0.5 to 30 parts by weight of a polyorganosilicone having a viscosity greater than 100,000 cps and containing fewer vinyl groups than component (1), (3) 0.5 to 50 parts by weight of a polyorganohydrogensiloxane having at least two hydrogen-bonded silicon atoms, and (4) a platinum catalyst. The high viscosity component (2) causes the viscosity of the composition to be greater than is desired and makes the coating of the composition difficult. Compositions of this type do not provide release levels as low as is provided by solvent-based silicone release coating compositions.

Assignee's copending application, U.S. Ser. No. 07/228,282 abandoned Jun. 4, 1990, discloses a silicone-based pressure-sensitive adhesive having high solids content comprising a flowable mixture of (a) a benzene soluble, resinous copolymer having triorganosiloxy and $SiO_{4/2}$ units, (b) a diorganoalkenylsiloxy endblocked polydiorganosiloxane, (c) a diorganohydrogensiloxy endblocked polydiorganosiloxane, (d) an organosilicon compound containing more than two groups that will react with a hydrogen or vinyl group of an organopolysiloxane by means of a hydrosilation reaction, and (e) a hydrosilation catalyst in an amount sufficient to effect curing of said composition.

With the exception of Japanese Kokai 61-159480, none of the foregoing disclose solventless release coating compositions that provide coatings having a slippery feel.

SUMMARY OF THE INVENTION

The present invention provides solventless, liquid, polyorganosiloxane compositions that can be cured to form a release coat that exhibits a slippery feel. These compositions comprise:

(a) a first polydiorganosiloxane terminated by silyl groups having one reactive group (hereinafter alpha group);

(b) a second polydiorganosiloxane terminated by silyl groups having one reactive group (hereinafter beta group), the alpha group being the same or different from the beta group, said alpha and beta groups being reactive with one another to form a covalent bond;

(c) a polyorganosiloxane having three or more reactive groups that are reactive with either the alpha group or the beta group or both to form a covalent bond; and (d) a catalyst for effecting the reaction of the reactive groups of (a), (b), and (c) to form covalent bonds.

The second polydiorganosiloxane (b) is a chain extender, the function of which is to bring about, upon curing the composition, an increase in the molecular weight of the polyorganosiloxane in order to provide long chains between sites of crosslinking to bring about a slippery feel to the surface of a cured coating of the composition. The polyorganosiloxane (c) is a crosslinking agent, the function of which is to convert the chain-extended composition to a solid.

The alpha and beta reactive groups are provided so that the chains of the first and second polydiorganosiloxanes (a) and (b), which are liquid polymers having a viscosity of less than 300 cps, preferably 25 to 50 cps, can be united, upon curing the composition, to form chains of greater molecular weight. The alpha and beta reactive groups are preferably chosen from hydrosilyl, silanol, alkenyl, acryloyl, hydroxyalkyl, aminoalkyl, epoxyalkyl, isocyanotoalkyl, halo, and other such reactive groups that can be combined so that one alpha group can be caused to react with one beta group to form a linear product.

DETAILED DESCRIPTION OF THE INVENTION

In a preferred class of solventless liquid polyorganosiloxane compositions, the reactive group (the alpha group) of the first diorganosiloxane (a) is an alkenyl group and the reactive group (the beta group) of the second polydiorganosiloxane (b) is a hydrogen atom directly attached to a silicon atom. The addition-reaction of a silicon-bonded hydrogen atom with an alkenyl group is commonly referred to as a hydrosilation reaction. The composition of this preferred class comprises:

(a) an alkenyldiorganosiloxy-terminated polydiorganosiloxane having the average structural formula:

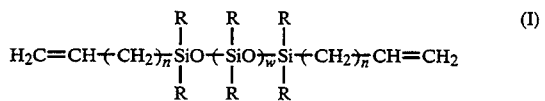

wherein each R can be the same or different and independently represents a member selected from the group consisting of monovalent aliphatic and aromatic hydrocarbon groups and halogenated derivatives thereof, cyanoalkyl groups, and combination thereof, e.g., 4-ethylphenyl, said groups preferably having 1 to 18 carbon atoms, preferably 1 to 4 carbon atoms, at least 50% of all R groups being methyl, w represents a number having a value of about 20 to about 250, preferably 30 to 50, so that the alkenyldiorganosiloxy-terminated polydiorganosiloxane has a viscosity of about 20 to 1,000 cps, preferably 25 to 500 cps, n represents zero or a number having a value of one to 16;

(b) a hydrogendiorganosiloxy-terminated polydiorganosiloxane chain extender having the average structural formula:

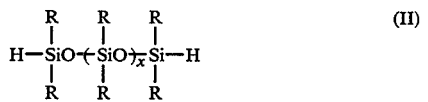

wherein each R is as defined above, and x represents a number having a value of about 100 to about 500, preferably 130 to 300, so that the hydrogendiorganosiloxy-terminated polydiorganosiloxane has a viscosity of about 150 to 5000 cps, preferably about 200 to 750 cps;

(c) a polyhydrogenorganosiloxane crosslinking agent, having the average structural formula:

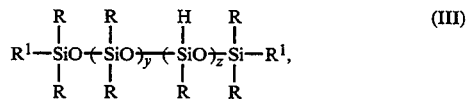

or $$R_aH_bSiO_{\frac{4-a-b}{2}} \quad (V)$$

wherein each R is as defined above, $R^1$ represents R or hydrogen, y represents a number having a value of 0 to 300, z represents a number having a value of 5 to 300, preferably 20 to 50, p represents an integer having a value of 3 to 6, inclusive, a represents a number having a value of 0 to 2.995, preferably 0.5 to 2, b represents a number having a value of 0.005 to 2.0, preferably 0.005 to 2.0, and the sum of a plus b is equal to a number having a value of 0.8 to 3, with the proviso that 0.5 to 5 silicon bonded hydrogen atoms are provided by (II), (III), (IV), and (V) per alkenyl group provided by (I); and (d) a hydrosilation catalyst $N^{10}$.

Ethylenically-unsaturated polysiloxanes (Formula I) include normally fluid materials that are preferably, but not necessarily, free of silanic hydrogen. Representative examples of R in Formula I include alkyl, such as methyl, ethyl, propyl, isopropyl, butyl, 2-ethylhexyl, octyl, and dodecyl, cycloalkyl, such as cyclopentyl, cyclohexyl, and cycloheptyl, aryl, such as phenyl, naphthyl, tolyl, and xylyl, aralkyl, such as benzyl, phenylethyl, and phenylpropyl, alkenylaryl, such as vinylphenyl, aralkenyl, such as styryl, halogenated derivatives of the aforementioned groups, such as chloromethyl, 2-fluoroethyl, 2,2,2-trifluoroethyl, 1,1 dihydroperfluoropropyl, 1,1-dihydroperfluorooctyl, 1,1-dihydroperfluorododecyl, 3,3,3-trifluoropropyl, chloropropyl, chlorophenyl, dibromophenyl, tetrachlorophenyl, and difluorophenyl, cyanoalkyl, such as betacyanoethyl, gamma-cyanopropyl, and betacyanopropyl. R is preferably a methyl group. Formula I is intended to include those substances wherein R can be one or more than one of the aforementioned groups.

The polyhydrosiloxane compounds and polymers represented by Formula II are normally liquid organopolysiloxanes that are preferably, but not necessarily, free of olefinic unsaturation in radical R.

Most preferably, the composition of the present invention comprises, in parts by weight, 10 to 300 parts of hydrogendiorganosiloxy-terminated polydiorganosiloxane, 1 to 10 parts of polyhydrogenorganosiloxane, and 10 to 200 ppm of precious metal hydrosilation catalyst per 100 parts of alkenyldiorganosiloxy-terminated polydiorganosiloxane and that there be in the composition about 1.0 to 3 silicon bonded hydrogen atoms per alkenyl group.

Alkenyldiorganosiloxy-terminated polydiorganosiloxanes (I) are well known. They can be prepared by the conventional method of cohydrolysis of a mixture of alkenyldiorganosilanes having one hydrolyzable group and one or more diorganosilanes having two hydrolyzable groups, at ratios of about one mole of alkenyldiorganosiloxanes to about 10 to about 150 moles of diorganosiloxanes having two hydrolyzable groups. For example, cohydrolysis of a mixture of two moles of alkenyldiorganochlorosilane with 20 moles of diorganodichlorosilane would give an alkenyldiorganosiloxy-terminated polydiorganosiloxane in which w has an average value of about 20. Examples of hydrolyzable organosilanes suitable for this invention include the organochlorosilanes, the organobromosilanes, and the organoacetoxysilanes. Examples of preferred hydrolyzable organosilanes are vinyldimethylchlorosilane, (5-hexenyl)dimethylchlorosilane, dimethyldichlorosilane, methylphenyldichlorosilane, and diphenyldichlorosilane. The hydrolyzable organosilanes and the ratios thereof should be selected so that at least 50% of the organo groups obtained in the diorganoalkenylsiloxy-terminated polydiorganosiloxane are methyl groups. A preferred method for the preparation of diorganoalkenylsiloxy endblocked polydiorganosiloxanes is by equilibration in the presence of an acid or base catalyst of a mixture of a 1,3-dialkenyltetraorganodisiloxane, such as 1,3-divinyltetramethyldisiloxane, and a polyorganocyclopolysiloxane, such as hexamethylcyclotrisiloxane or octamethylcyclotetrasiloxane.

Hydrogendiorganosiloxy-terminated polydiorganosiloxanes (II) are also well known. They can be prepared by conventional acid catalysis methods analogous to the methods used for preparing alkenyldiorganosiloxy-terminated polydiorganosiloxanes, using in the cohydrolysis process a hydrolyzable hydrogendiorganosilane, such as dimethylchlorosilane, in place of the hydrolyzable alkenyldiorganochlorosilane and, in the equilibration process, a 1,1,3,3-tetraorganodisiloxane, such as 1,1,3,3-tetramethyldisiloxane, in place of the 1,3-dialkenyltetraorganodisiloxane.

Polyhydrogenorganosiloxane crosslinking agents (III) can be prepared by conventional methods analogous to the procedures for preparing the alkenyldiorganosiloxy and hydrogendiorganosiloxy-terminated polydiorganosiloxanes mentioned previously. For example, a mixture of hydrogen organosilanes, and optionally diorganosilanes, each having two hydrolyzable groups, can be cohydrolyzed with terminating organosilanes having only one hydrolyzable group. Examples of organosilanes having two hydrolyzable groups suitable for use in the preparation of the crosslinking agent of this invention are methyldichlorosilane, phenyldichlorosilane, dimethyldichlorosilane, and dimethyldichlorosilane. Examples of organosilanes having only one hydrolyzable group suitable for use as the terminating group in preparing the crosslinking agent of this invention are trimethylchlorosilane and chlorodimethylphenylsilane. Other organosilanes having one and two hydrolyzable groups can be used as can organosilanes having hydrolyzable groups other than the chloro group, such as, for example, bromosilanes, acetoxysilanes and alkoxysilanes.

Crosslinking agents (III) are well known and can be obtained commercially. An example is polymethylhydrogensiloxane, available as DC-1107 from Dow Corning Corporation.

The hydrosilation catalyst can be any compound that will catalyze the addition reaction of silicon-bonded hydrogen atoms with olefinic double bonds. Examples of hydrosilation catalysts suitable for the composition of this invention include many of the noble metals, such as rhodium, nickel, palladium, and platinum, and their organometallic complexes. Preferred catalysts are those containing the element platinum, such as finely divided platinum metal, platinum on a finely divided carrier such as charcoal or alumina, and compounds of platinum such as chloroplatinic acid, platinum olefin complexes, such as those described in U.S. Pat. No. 3,159,601, platinum alkyne complexes, such as those described in U.S. Pat. No. 4,603,215, the reaction product of chloroplatinic acid with a member selected from the class consisting of alcohols, ethers, aldehydes and mixtures thereof, such as those described in U.S. Pat. No. 3,220,972, and the reaction product of chloroplatinic acid with tetravinylcyclotetrasiloxane in the presence of sodium bicarbonate in ethanol solution, such as those described in U.S. Pat. No. 3,715,334. Particularly preferred catalysts are the complexes prepared from chloroplatinic acid and certain unsaturated organosilicon compounds, such as those described in U.S. Pat. No. 3,419,593, for example, the reaction product of chloroplatinic acid and symdivinyltetramethyldisiloxane. Another particularly preferred catalyst is a Colloidal hydrosilation catalyst provided by the reaction between a silicon hydride or a siloxane hydride and a platinum (0) or platinum (II) complex, such as those described in U.S. Pat. No. 4,705,765. Still other particularly preferred catalysts are those that are activated by actinic radiation, such as the ($\eta^4$-cyclooctadiene)diarylplatinum complexes and the ($\eta^5$-cyclopentadienyl)trialiphaticplatinum complexes described in U.S. Pat. Nos. 4,530,879 and 4,510,094, respectively.

Depending on the hydrosilation catalyst employed, it may be desirable to include a hydrosilation inhibitor to extend the pot life of the formulation. Hydrosilation inhibitors are well known and include such compounds as acetylenic alcohols, certain polyolefinic siloxanes, pyridine, acrylonitrile, organic phosphines and phosphites, unsaturated amides, and alkyl maleates.

Since the components of the release coating composition of the invention are liquids, all having a viscosity at the most of no more than 5000 centipoise at 25° C., the composition can be prepared simply by mixing the alkenyldiorganosiloxy-terminated polydiorganosiloxane, the hydrogendiorganosiloxy-terminated polydiorganosiloxane, the polyhydrogenorganosiloxane crosslinking agent, the inhibitor (when used), and finally the hydrosilation catalyst.

The composition can be applied to a substrate by any suitable method, such as, for example, spraying, dipping, knife coating, curtain coating, roll coating, or the like. .The substrate can be any solid material, such as, for example, a metal, e.g., aluminum or steel, a porous material, e.g., paper, wood, or fabrics, an organic polymeric material, such as polyester, polyamide, polyolefin, etc., a painted surface, a siliceous material, e.g., concrete or glass, on which a release surface having a slippery feel is desired. Once applied, the composition can be cured under conditions appropriate to the hydrosilation catalyst employed. For example, if the catalyst is the reaction product of chloroplatinic acid and symdivinyltetramethyldisiloxane, the composition can be cured slowly at room temperature or rapidly by heating. If the catalyst is a ($\eta^5$-cyclopentadienyl)trialkylplatinum complex, the composition can be cured by exposure to actinic radiation, optionally followed by heating.

In another class of solventless liquid polyorganosiloxane compositions of this invention, the reactive group (the alpha group) of the first polydiorganosiloxane (a) is a hydroxyl group attached directly to a silicon atom, and the reactive group (the beta group) of the second polydiorganosiloxane (b) is a hydrogen atom attached directly to a silicon atom. The reaction of a silicon-bonded hydroxyl group with a hydrogen atom attached directly to a silicon atom that results in the formation of a siloxane bond is commonly referred to as a condensation reaction.

The compositions in that class comprise:
(a) a diorganosilanol-terminated polydiorganosiloxane having the average structural formula:

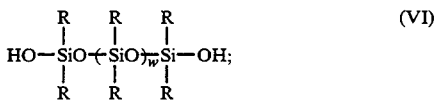

(b) a hydrogendiorganosiloxy-terminated polydiorganosiloxane chain extender having the average structural formula:

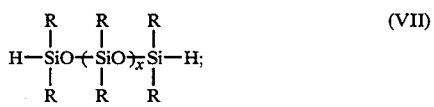

(c) a polyhydrogenorganosiloxane crosslinking agent having the average structural formula:

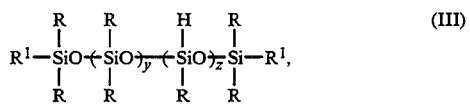

or

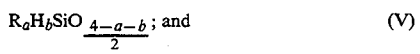

(d) a condensation catalyst,
wherein R, $R^1$, w, x, y, and z are as defined previously.

Various additives can be included in the curable compositions, depending on the intended purpose of the composition. Fillers, pigments, or both, such as chopped fibers, crushed polymers, talc, clay, titanium dioxide, and fumed silica can be added. Soluble dyes, oxidation inhibitors, and/or any material that does not interfere with the catalytic activity of the platinum complex and is transparent to ultraviolet radiation at a wavelength below about 4000 Å (if ultraviolet radiation is to be used to bring about the hydrosilation reaction) can be added to the composition.

Also, when it is desired to modify the release character of the cured organosiloxane compositions of the invention, e.g., increase the adhesive release level from the surface of the cured organosilicon composition from a low value of less than about 2 g/cm width to a higher value of 10 to 150 g/cm width or more, release modifiers can be added to the composition as are known in the silicone release art. Examples of such release modifiers include graft polymers having a polyorganosiloxane segment and an organic polymer segment as are described in U.S. Pat. No. 4,366,286; vinyl-terminated diorganopolysiloxanes in which 2 to 50, and preferably 3 to 39, mole percent of the diorgano units are nonterminal diphenylsiloxane units; the three-dimensional-toluene-soluble silicate resins known in the silicate art as MQ resins, which resins are the co-hydrolysis product of a mixture of one or more hydrolyzable silanes of the formula $(R^5)_cSiY_{4-c}$ in which $R^5$ represents a monovalent hydrocarbon group attached to silicon, Y represents a hydrolyzable group (i.e., a group that with water undergoes a metathetical reaction and is replaced by hydroxyl), and c represents zero or an integer selected from the group consisting of of 1, 2, and 3. Such compounds are known in the art and are described in part in U.S. Pat. No. 3,936,582 and more fully in U.S. Pat. Nos. 2,676,182 and 2,857,356, which patents are incorporated herein by reference. The reaction products of MQ resins with organohydrogenpolysiloxanes are described in U.S. Pat. Nos. 4,310,678 and 4,322,518, which patents are incorporated herein by reference. A preferred MQ modifier is that obtained by the co-hydrolysis of 0.5 mole of $(CH_3)_3SiCl$ and 0.5 to 1.0 mole of $Si(OC_2H_5)_4$ followed by reaction with $[(CH_3)_3Si]_2NH$ or $[(CH_2\!\!=\!\!CH)(CH_3)_2Si]_2NH$ to reduce the hydroxyl level of the modifier to less than 1.0% by weight. Release modifiers find use in differential release liners for adhesive material. A typical liner comprises a flexible substrate (e.g., paper, polymeric film, metal foil) bearing on each major surface thereof the cured composition of the present invention, the composition on at least one of said surfaces comprising a release modifier so as to provide an adhesive release differential of at least 10%. A preferred release liner for adhesive materials comprises a substrate bearing on each major surface the above-described cured composition, wherein in the composition on one of said surfaces R represents methyl, and in the composition on the second surface 2 to 50 mole percent, preferably 3 to 39 mole percent, and most preferably 5 to 25 mole percent of R represents phenyl and the remaining R represents methyl.

The primary advantage of the compositions of the present invention are that they are solvent free and yet provide coatings that provide slipperiness in addition to release. Such release coatings are desirable in the manufacture of differential release liners, which in turn are used to prepare transfer tapes. Transfer tapes are typically hand applied by rubbing the liner with the backside of the hand to adhere the pressure-sensitive adhesive onto adherend prior to liner removal. In the case of transfer tapes constructed from slippery silicone liners, the applicator's hand slides easily over the release liner and satisfactory application is achieved. In the case where the transfer tape is constructed from a conventional solventless addition cure SFS based liners, the applicator's hand chatters over the liner, or worse yet, the applicator's hand is injured due to high friction on the liner, and as a result, the pressure-sensitive adhesive is not adhered well to adherend because application pressure was not uniform.

Advantages of this invention are further illustrated by the following examples, where amounts are expressed in parts by weight. The particular materials and amounts recited as well as other conditions and details given should not be construed to unduly limit this invention.

EXAMPLES

To quantify the slipperiness exhibited by release materials of the present invention, release liner samples were prepared on super calendered Kraft paper at silicone depositions of at least 2 g/m², and coefficient of friction was measured according to ASTM D-1894-63.

Examples 1-3

Release coating compositions containing the amounts of vinyldimethylsiloxy-terminated (VDMS-terminated) polydimethylsiloxane (PDMS) with an average degree of polymerization of about 130 (DP 130) (the compound of Formula I in which R is methyl, w is 130, and n is zero), hydrogendimethylsiloxy-terminated (HDMS-terminated) PDMS (DP 246) (the compound of Formula II in which R is methyl and x is 246), and polymethylhydrogen siloxane (PHMS) (DP 35) crosslinking agent (the compound of Formula III in which R and R' are methyl, y is zero, and z is 35) as shown in Table I were prepared. Each composition also contained a 0.25% 2-ethyl hexyl hydrogen maleate and 150 ppm platinum as a complex of divinyltetramethyldisiloxane. The amount of crosslinking agent for each example was chosen to give final formulations having a ratio of 1.5 silicon-bonded hydrogen atoms per 1.0 silicon-bonded alkenyl group. These compositions were mixed thoroughly, coated onto a super calendered Kraft paper using a blade coater, and cured for two minutes at 150° C. Coefficients of friction were measured according to ASTM D-1894-63 and reported in Table I.

Comparative Example A

This example demonstrates the performance of a solventless silicone release coating of the prior art that is cured by hydrosilation reaction. To 50 parts by weight of VDMS-terminated PDMS (DP 130) containing 150 ppm platinum (as a complex with divinyltetramethyldisiloxane) and 0.25% 2-ethylhexyl hydrogen maleate was added 1.25 parts by weight PHMS (DP 35). This composition was coated, cured, and tested as described in Examples 1-3. The results are recorded in Table I.

TABLE I

| Example no. | VDMS-terminated PDMS (DP 130) | HDMS-terminated PDMS (DP 246) | PHMS (DP 35) | Coefficient of friction |
|---|---|---|---|---|
| 1 | 70 | 30 | 1.4 | 0.51 |
| 2 | 60 | 40 | 1.2 | 0.50 |
| 3 | 50 | 50 | 1.0 | 0.46 |
| Comparative A | 100 | 0 | 2.5 | 0.63 |

The data of Table I show that the coefficient of friction of the cured coatings decreases as the concentration of HDMS-terminated PDMS (DP 246) increases.

Examples 4-8

Release coating compositions were prepared as described in Examples 1-3 using VDMS-terminated PDMS having a degree of polymerization of about 75 (DP 75) in place of VDMS-terminated PDMS (DP 130). The compositions prepared and the data obtained are presented in Table II.

TABLE II

| Example no. | VDMS-terminated PDMS (DP 75) | HDMS-terminated PDMS (DP 246) | PHMS (DP 35) | Coefficient of friction |
|---|---|---|---|---|
| 4 | 80 | 20 | 2.73 | 0.44 |
| 5 | 70 | 30 | 2.34 | 0.31 |
| 6 | 60 | 40 | 2.05 | 0.39 |
| 7 | 50 | 50 | 1.66 | 0.41 |
| 8 | 40 | 60 | 1.37 | 0.44 |

The data of Table II show that, by replacing the VDMS-terminated PDMS (DP 130) used in Examples 1, 2, and 3 with the lower molecular weight VDMS-terminated PDMS (DP 75) used in Examples 4-8, the values of coefficient of friction obtained are reduced. For the compositions containing VDMS-terminated PDMS (DP 75), a minimum value of coefficient of friction of 0.31 is obtained at a 70:30 weight ratio of VDMS-terminated PDMS to HDMS-terminated PDMS. The value of coefficient of friction increases as the weight ratio of VDMS-terminated PDMS to HDMS-terminated PDMS is varied in either direction from the minimum point.

Examples 9-13

Release coating compositions were prepared as described in Examples 1-3 using VDMS-terminated PDMS (DP 35) (viscosity of 50 cps) in place of VDMS-terminated PDMS (DP 130). The compositions prepared and data obtained are presented in Table III.

TABLE III

| Example no. | VDMS-terminated PDMS (DP 35) | HDMS-terminated PDMS (DP 246) | PHMS (DP 35) | Coefficient of friction |
|---|---|---|---|---|
| 9 | 70 | 30 | 4.88 | 0.31 |
| 10 | 60 | 40 | 4.19 | 0.30 |
| 11 | 50 | 50 | 3.51 | 0.32 |
| 12 | 40 | 60 | 2.83 | 0.34 |
| 13 | 30 | 70 | 2.15 | 0.43 |

The data of Table III show that relatively low coefficients of friction are obtained for compositions wherein the ratio of VDMS-terminated PDMS to HDMS-terminated PDMS ranges from 70:30 to 30:70.

Examples 14-18

Release coating compositions containing 60 parts by weight VDMS-terminated PDMS (DP 35) and 40 parts by weight HDMS-terminated PDMS (DP 246) as used in Example 10 were prepared as described in Examples 1-3. Then, crosslinking agent PHMS (DP 35) in the amount as shown in Table IV, was added to provide silicon-bonded hydrogen to silicon-bonded alkenyl ratios of 1:1 to 2:1. The compositions were coated, cured, and the coefficient of friction of each coating measured as described in Examples 1-3. The results of these measurements are presented in Table IV. To each cured coating, an acrylic adhesive was applied at a coating weight of 32 g/m$^2$ and dried for 5 minutes at 70° C. in a circulating air oven. A film of polyester (50 micrometer thick) was laminated to each adhesive surface and each laminate cut into two pieces. One piece was aged for three days at room temperature and the other piece was aged for three days at 70° C. Release values for each sample were measured by pulling the polyester film with attached adhesive from the cured silicone release surface at an angle of 180° and a peel speed of 2.3 meters per minute. The adhesive coated polyester film was then pressed onto a clean sheet of glass and the force required to peel it off at an angle of 180° and a pulling speed of 2.3 meters per minute was measured to determine the readhesion value for each sample.

TABLE IV

| Example no. | g PHMS (DP 35)/100 g VDMS/HDMS mixture | Ratio SiH/SiVi[a] | Coefficient of friction | Release (g/cm) RT[b] | Release (g/cm) 70° C.[c] | Readhesion (g/cm) RT[b] | Readhesion (g/cm) 70° C.[c] |
|---|---|---|---|---|---|---|---|
| 14 | 2.80 | 1:1 | 0.31 | 3.6 | 4.8 | 550 | 535 |
| 15 | 3.50 | 1.25:1 | 0.28 | 3.6 | 4.4 | 590 | 590 |
| 16 | 4.20 | 1.5:1 | 0.29 | 3.2 | 4.4 | 570 | 560 |

TABLE IV-continued

| Example no. | g PHMS (DP 35)/100 g VDMS/HDMS mixture | Ratio SiH/SiVi[a] | Coefficient of friction | Release (g/cm) RT[b] | Release (g/cm) 70° C.[c] | Readhesion (g/cm) RT[b] | Readhesion (g/cm) 70° C.[c] |
|---|---|---|---|---|---|---|---|
| 17 | 4.90 | 1.75:1 | 0.28 | 4.0 | 5.6 | 525 | 490 |
| 18 | 5.60 | 2.0:1 | 0.24 | 4.0 | 4.8 | 515 | 515 |

[a]ratio of silicon-bonded hydrogen in the PHMS (DP 35) to silicon-bonded vinyl group in the VDMS-terminated PDMS (DP 35)
[b]value after aging three days at room temperature
[c]value after aging three days at 70° C.

The data of Table IV show that the concentration of crosslinking agent within the range of 1:1 to 2:1 has little effect on release and readhesion performance. The coefficient of friction of 0.24 to 0.31 shows that concentration of crosslinking agent within the 1:1 to 2:1 range has little influence on the coefficient of friction.

Example 19

This example illustrates a composition of the present invention where hexenyl-functional polydimethylsiloxane is used in place of the vinyl functional polydimethylsiloxanes employed in Examples 1–18.

A glass jar was charged with 200 parts by weight octamethylcyclotetrasiloxane, 23 parts by weight 1,3-bis(1-hex-5-enyl)tetramethyldisiloxane, 1.11 parts by weight activated carbon, and 0.22 parts by weight concentrated sulfuric acid. The jar was sealed and shaken at room temperature for six hours. The mixture was then vacuum filtered and placed in a round-bottom flask where volatile components were removed by vacuum distillation. The remaining material was a hexenyl-terminated polydimethylsiloxane having a viscosity of 63 centipoise. The identity of this material was confirmed by $^1$H and $^{29}$Si NMR and a total degree of polymerization of 32 was suggested.

To 12 parts by weight of this hexenyl-terminated polydimethylsiloxane were added 8.02 parts by weight of HDMS-terminated PDMS (DP 246), 100 ppm platinum as a platinum/vinyl siloxane complex, 0.07 parts by weight of 2-ethylhexyl hydrogen maleate, and 0.38 parts by weight of PHMS (DP 35).

This composition was applied to a 53 lb semibleached super calendered Kraft paper using a blade over roll coater at a coating weight ranging from approximately 2.0 to 2.5 g/m² and cured as described in Example 1. Coefficient of friction and release performance were determined as in Examples 14–18.

The coefficient of friction was 0.20. The release values were as follows:
3 day RT--8 g/in
3 day 70° C.--13 g/in.
The readhesion values were as follows:
3 day RT--43 oz/in
3 day 70° C.--42 oz/in.

The data in Table V show that the composition of this invention gives a low coefficient of friction coating exhibiting excellent release and readhesion properties.

Examples 20–24

These examples illustrate the preparation of release liners of this invention having low coefficient of friction by means of a condensation curing step rather than a hydrosilation curing step.

A series of compositions comprising a diorganosilanol-terminated polydimethylsiloxane fluid having a viscosity of 50 cps (hereinafter referred to as Polymer A), a hydrogendiorgansiloxy-terminated polydimethylsiloxane fluid (HDMS-terminated PDMS (DP 270)) and a crosslinking agent (PHMS (DP 35)) were prepared. Each of the compositions contained 100 ppm platinum (as a complex of divinyltetramethyldisiloxane) and 0.25% by weight 2-ethylhexyl hydrogen maleate inhibitor. The amounts of catalyst and inhibitor were based on total reactants present. The compositions were coated and cured in the same manner as described in Example 1 to provide samples for coefficient of friction measurements. Table VI sets forth the compositions prepared and the results of coefficient of friction measurements from these compositions.

TABLE VI

| Example no. | Polymer A | HDMS-terminated PDMS (DP 270) | PHMS (DP 35) | Coefficient of friction |
|---|---|---|---|---|
| 20 | 9.0 | 1.0 | 0.79 | 0.17 |
| 21 | 8.0 | 2.0 | 0.69 | 0.19 |
| 22 | 7.0 | 3.0 | 0.61 | 0.23 |
| 23 | 6.0 | 4.0 | 0.49 | 0.28 |
| 24 | 5.0 | 5.0 | 0.39 | 0.28 |

The cured coating of Example 20 was tested for release performance in the same manner as were the compositions of Examples 14–18 and the release values were as follows:
3 day RT--12 g/in
3 day 70° C. --21 g/in.
The readhesion values were as follows:
3 day RT--42 oz/in
3 day 70° C.--42 oz/in.

These results show that this composition performs well as a release material, exhibiting both low release forces and stable readhesion values.

Comparative Example B

For comparison, another composition, representative of the prior art and similar to the compositions of Examples 20–24, but containing no HDMS-terminated PDMS (DP 270), was prepared. A glass jar was charged with 9.0 g Polymer A, 0.9 g PHMS (DP 35), and 0.5 g dibutyl tin diacetate. This composition was coated and cured as above to obtain a sample for coefficient of friction measurement. The coefficient of friction of this sample was 0.36.

This comparison shows that compositions of the present invention provide stable release levels and a significant reduction in coefficient of friction with respect to compositions of the prior art.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A curable, solventless, liquid, polyorganosiloxane composition consisting essentially of:

(a) 100 parts by weight of a linear difunctional alkenyl-diorganosiloxy-terminated polydiorganosiloxane;

(b) 10 to 300 parts by weight of a linear difunctional hydrogendiorganosiloxy-terminated polydiorganosiloxane having the average structural formula:

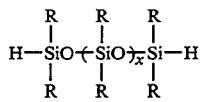

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, a cyanoalkyl radicals, and combinations thereof, R having 1 to 18 carbon atoms, at least 50% of all R groups being methyl, and x represents a number having a value of about 100 to 500;

(c) 1 to 10 parts by weight of a crosslinking agent consisting of a polyhydrogenorganosiloxane having three or more reactive groups that are reactive with the reactive alkenyl group of component (a) to form a covalent bond, said polyhydrogenorganosiloxane being a member of the group consisting of

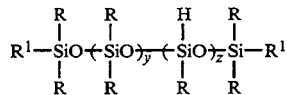

and

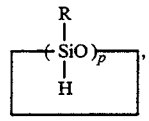

wherein each R is bonded to a silicon atom and independently represents a monovalent group selected from the group consisting of monovalent aliphatic and aromatic hydrocarbon radicals and halogenated derivatives thereof, and cyanoalkyl radicals, and combinations thereof, R having 1 to 18 carbon atoms, at least 50% of all R groups being methyl, $R^1$ represents R or hydrogen, y represents a number having a value of 0 to 300, z represents a number having a value of 5 to 300, p represents an integer having a value of 3 to 6, inclusive, with the proviso that from about 1.0 to 3.0 silicon bonded hydrogen atoms are provided by component (b) and component (c) per alkenyl group provided by component (a) and (d) a catalyst in an amount sufficient for effecting the reaction of the reactive groups of components (a), (b), and (c) to form covalent bonds, said composition being free of crosslinking agents other than those designated in component (c).

2. The composition of claim 1, wherein the alkenyldiorganosiloxy-terminated polydiorganosiloxane has the average structural formula:

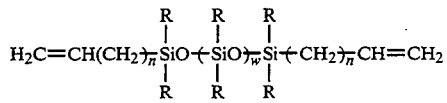

wherein each R is bonded to a silicon atom and independently represents a monovalent group selected from the group consisting of monovalent aliphatic or aromatic hydrocarbon radicals a halogenated monovalent aliphatic or halogenated monovalent aromatic hydrocarbon radicals, cyanoalkyl radicals, and combinations thereof, R having 1 to 18 carbon atoms, at least 50% of all R groups being methyl, w represents a number having a value of about 20 to 250, and n represents zero or a number having a value of one to 16.

3. A curable, solventless, liquid, polyorganosiloxane composition, curable by a condensation reaction, consisting essentially of (a) 100 parts by weight of a linear difunctional diorganosilanol-terminated polydiorganosiloxane, (b) 10 to 300 parts by weight of a linear difunctional hydrogendiorganosiloxy-terminated polydiorganosiloxane, (c) 1 to 10 parts by weight of a crosslinking agent consisting of a polyhydrogenorganosiloxane having three or more reactive groups that are reactive with the reactive silanol group of component (a) to form a covalent bond, said polyhydrogenorganosiloxane being a member of the group consisting of

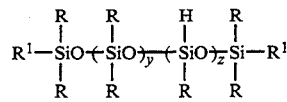

and

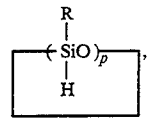

wherein each R is bonded to a silicon atom and independently represents a monovalent group selected from the group consisting of monovalent aliphatic and aromatic hydrocarbon radicals and halogenated derivatives thereof, and cyanoalkyl radicals, and combinations thereof, R having 1 to 18 carbon atoms, at least 50% of all R groups being methyl, $R^1$ represents R or hydrogen, y represents a number having a value of 0 to 300, z represents a number having a value of 5 to 300, p represents an integer having a value of 3 to 6, inclusive, with the proviso that there are about 0.5 to 5.0 silicon-bonded hydrogen atoms per silanol group, and (d) a condensation catalyst in an amount sufficient for effecting the reaction of the reactive groups of components (a), (b), and (c) to form covalent bonds, said composition being free of crosslinking agents other than those designated in component (c).

4. The composition of claim 3, wherein the diorganosilanol-terminated polydiorganosiloxane has the average structural formula:

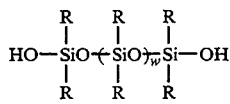

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, and w represents a number having a value of about 20 to 250.

5. The composition of claim 1, wherein the hydrogendiorganosiloxy-terminated polydiorganosiloxane has the average structural formula:

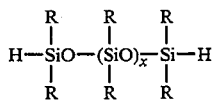

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, and x represents a number having a value of about 100 to 500.

6. A process for providing a substrate with a release coating that exhibits slippery feel comprising the steps of:
   (1) coating the substrate with the composition of claim 1; and
   (2) subjecting the coated substrate to conditions to effect cure of the composition.

7. A curable, solventless, liquid, polyorganosiloxane composition, curable by a condensation reaction, consisting essentially of
   (a) 100 parts by weight of a linear difunctional diorganosilanol-terminated polydiorganosiloxane,
   (b) 10 to 300 parts by weight of a linear difunctional hydrogendiorganosiloxy-terminated polydiorganosiloxane,
   (c) 1 to 10 parts by weight of a crosslinking agent consisting of a polyhydrogenorganosiloxane having three or more reactive groups that are reactive with the reactive silanol group of component (a) to form a covalent bond, said polyhydrogenorganosiloxane being a member of the group consisting of

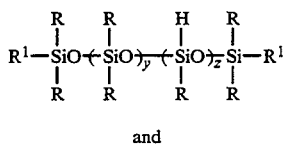

and

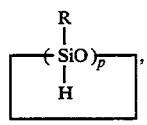

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, $R^1$ represents R or hydrogen, y represents a number having a value of 0 to 300, z represents a number having a value of 5 to 300, p represents an integer having a value of 3 to 6, inclusive, with the proviso that there are about 0.5 to 5.0 silicon-bonded hydrogen atoms per silanol group, and
   (d) a condensation catalyst in an amount sufficient for effecting the reaction of the reactive groups of components (a), (b), and (c) to form covalent bonds, said composition being free of crosslinking agents other than those designated in component (c).

8. A differential release liner bearing on one major surface a layer of the cured polyorganosiloxane composition of claim 1 and on the other major surface a layer of the cured polyorganosiloxane composition of claim 1, further containing a release modifier.

9. An adhesive transfer tape comprising the differential release liner of claim 8 and a layer of pressure-sensitive adhesive.

10. A tape comprising a flexible substrate bearing on one major surface thereof a layer of the cured polyorganosiloxane composition of claim 1 and on the other major surface thereof a layer of pressure-sensitive adhesive.

11. A curable, solventless, liquid, polyorganosiloxane composition consisting essentially of:
   (a) 100 parts by weight of a linear difunctional alkenyl-diorganosiloxy-terminated polydiorganosiloxane;
   (b) 10 to 300 parts by weight of a linear difunctional hydrogendiorganosiloxy-terminated polydiorganosiloxane having the average structural formula:

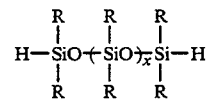

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, and x represents a number having a value of about 100 to 500;
   (c) 1 to 10 parts by weight of a crosslinking agent consisting of a polyhydrogenorganosiloxane having three or more reactive groups that are reactive with the reactive alkenyl group of component (a) to form a covalent bond, said polyhydrogenorganosiloxane being a member of the group consisting of

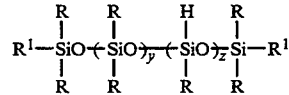

-continued
and

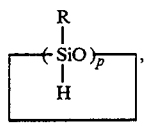

wherein each R is bonded to a silicon atom and independently represents a monovalent group selected from the group consisting of monovalent aliphatic and aromatic hydrocarbon radicals and halogenated derivatives thereof, and cyanoalkyl radicals, and combinations thereof, R having 1 to 18 carbon atoms, at least 50% of all R groups being methyl, $R^1$ represents R or hydrogen, y represents a number having a value of 0 to 300, z represents a number having a value of 5 to 300, p represents an integer having a value of 3 to 6, inclusive, with the proviso that 1.0 to 3.0 silicone bonded hydrogen atoms are provided by component (b) and component (c) per alkenyl group provided by component (a), and (d) a catalyst in an amount sufficient for effecting the reaction of the reactive groups of components (a), (b), and (c) to form covalent bonds, provided that said composition contains no more than 4.9 parts by weight crosslinking agent per 100 parts by weight of component (a) plus component (b).

12. The composition of claim 11, wherein the alkenyldiorganosiloxy-terminated polydiorganosiloxane has the average structural formula:

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, w represents a number having a value of about 20 to 250, and n represents zero or a number having a value of one to 16.

13. A curable, solventless, liquid, polyorganosiloxane composition curable by a condensation reaction, consisting essentially of (a) 100 parts by weight of a linear difunctional diorganosilanol-terminated diorganosiloxane,
(b) 10 to 300 parts by weight of a linear difunctional hydrogendiorgansiloxy-terminated polydiorganosiloxane,
(c) 1 to 10 parts by weight of a crosslinking agent consisting of a polyhydrogenorganosiloxane having three or more reactive groups that are reactive with the reactive hydroxyl group of component (a) to form a covalent bond, said polyhydrogenorganosiloxane being a member of the group consisting of

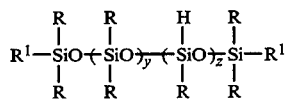

-continued
and

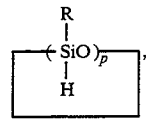

wherein each R is bonded to a silicon atom and independently represents a monovalent group selected from the group consisting of monovalent aliphatic and aromatic hydrocarbon radicals and halogenated derivatives thereof, cyanoalkyl radicals, and combinations thereof, R having 1 to 18 carbon atoms, at least 50% of all R groups being methyl, $R^1$ represents R or hydrogen, y represents a number having a value of 0 to 300, z represents a number having a value of 5 to 300, p represents an integer having a value of 3 to 6, inclusive, with the proviso that there are about 0.5 to 5.0 silicon-bonded hydrogen atoms per silanol group, and (d) a condensation catalyst in an amount sufficient for effecting the reaction of the reactive groups of components (a), (b), and (c) to form covalent bonds, said composition containing up to 4.9 parts by weight crosslinking agent per 100 parts by weight of component (a) plus component (b).

14. The composition of claim 13, wherein the diorganosilanol-terminated polydiorganosiloxane has the average structural formula:

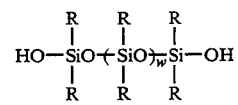

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, and w represents a number having a value of about 20 to 250.

15. The composition of claim 13, wherein the hydrogendiorganosiloxy-terminated polydiorganosiloxane has the average structural formula:

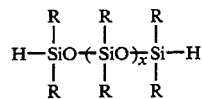

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, and x represents a number having a value of about 100 to 500.

16. A process for providing a substrate with a release coating that exhibits slippery feel comprising the steps of:

(1) coating the substrate with the composition of claim 11; and (2) subjecting the coated substrate to conditions to effect cure of the composition.

17. A curable, solventless, liquid, polyorganosiloxane composition consisting essentially of:
(a) 100 parts by weight of a linear difunctional alkenyl-diorganosiloxy-terminated polydiorganosiloxane;
(b) 10 to 300 parts by weight of a linear difunctional hydrogendiorganosiloxy-terminated polydiorganosiloxane having the average structural formula:

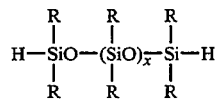

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, and x represents a number having a value of about 100 to 500;
(c) 1 to 10 parts by weight of a crosslinking agent consisting of a polyhydrogenorganosiloxane having three or more reactive groups that are reactive with the reactive silanol group of component (a) to form a covalent bond, said polyhydrogenorganosiloxane being a member of the group consisting of

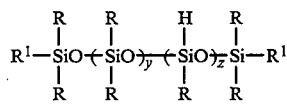

and

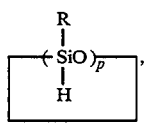

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, $R^1$ represents R or hydrogen, y represents a number having a value of 0 to 300, z represents a number having a value of 5 to 300, p represents an integer having a value of 3 to 6, inclusive, with the proviso that 1.0 to 3.0 silicone bonded hydrogen atoms are provided by component (b) and component (c) per alkenyl group provided by component (a), and
(d) a catalyst in an amount sufficient for effecting the reaction of the reactive groups of components (a), (b), and (c) to form covalent bonds, provided that said composition contains no more than 4.9 parts by weight crosslinking agent per 100 parts by weight of component (a) plus component (b).

18. A differential release liner bearing on one major surface a layer of the cured polyorganosiloxane composition of claim 11 and on the other major surface a layer of the cured polyorganosiloxane composition of claim 17, further containing a release modifier.

19. An adhesive transfer tape comprising the differential release liner of claim 18 and a layer of pressure-sensitive adhesive.

20. A tape comprising a flexible substrate bearing on one major surface thereof a layer of the cured polyorganosiloxane composition of claim 11 and on the other major surface thereof a layer of pressure-sensitive adhesive.

21. The composition of claim 17, wherein the hydrogendiorganosiloxy-terminated polydiorganosiloxane has the average structural formula:

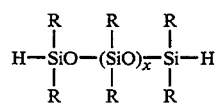

wherein each R is bonded to a silicon atom and independently represents a monovalent group selected from the group consisting of monovalent aliphatic or aromatic hydrocarbon radicals, halogenated monovalent aliphatic or halogenated monovalent aromatic hydrocarbon radicals, cyanoalkyl radicals, and combinations thereof, R having 1 to 18 carbon atoms, at least 50% of all R groups being methyl, and x represents a number having a value of about 1 00 to 500.

22. A process for providing a substrate with a release coating that exhibits slippery feel comprising the steps of:
(1) coating the substrate with the composition of claim 1; and
(2) subjecting the coated substrate to conditions to effect cure of the composition.

* * * * *

UNITED STATES PATENT AND TRADEMARK OFFICE
CERTIFICATE OF CORRECTION

PATENT NO. : 5,432,006             Page 1 of 2
DATED       : July 11, 1995
INVENTOR(S) : Carl R. Kessel et al.

It is certified that error appears in the above-indentified patent and that said Letters Patent is hereby corrected as shown below:

Column 13, line 47, delete "and" and insert --or--

Column 13, line 48, after "radicals" insert --,--

Column 13, line 48, delete "and"

Column 13, lines 48 and 49, delete "derivatives thereof" and insert --monovalent aliphatic or halogenated monovalent aromatic hydrocarbon radicals--

Column 13, line 49, delete "and"

Column 14, line 49, delete "and" and insert --or--

Column 14, line 50, after "radicals" insert --,--

Column 14, line 50, delete "and"

Column 14, lines 50 and 51, delete "derivatives thereof" and insert --monovalent aliphatic or halogenated monovalent aromatic hydrocarbon radicals--

Column 14, line 51, delete "and"

UNITED STATES PATENT AND TRADEMARK OFFICE
CERTIFICATE OF CORRECTION

PATENT NO. : 5,432,006
DATED : July 11, 1995
INVENTOR(S) : Carl R. Kessel et al.

It is certified that error appears in the above-indentified patent and that said Letters Patent is hereby corrected as shown below:

Column 17, line 12, delete "and" and insert --or--

Column 17, line 13, after "radicals" insert --,--

Column 17, line 13, delete "and"

Column 17, lines 13 and 14, delete derivatives thereof" and insert --monovalent aliphatic or halogenated monovalent aromatic hydrocarbon radicals--

Column 17, line 14, delete "and"

Signed and Sealed this

Seventeenth Day of December, 1996

Attest:

BRUCE LEHMAN

Attesting Officer

Commissioner of Patents and Trademarks